(12) United States Patent
Govindan et al.

(10) Patent No.: US 8,074,458 B2
(45) Date of Patent: Dec. 13, 2011

(54) POWER PLANT HEAT RECOVERY SYSTEM HAVING HEAT REMOVAL AND REFRIGERATOR SYSTEMS

(75) Inventors: Prakash Narayan Govindan, Chennia (IN); Anil Kumar Sharma, Rewa (IN); Shinoj Vakkayil Chandrabose, Thrissur Kerala (IN)

(73) Assignee: General Electric Company, Schenectady, NY (US)

( * ) Notice: Subject to any disclaimer, the term of this patent is extended or adjusted under 35 U.S.C. 154(b) by 499 days.

(21) Appl. No.: 12/183,503

(22) Filed: Jul. 31, 2008

(65) Prior Publication Data

US 2010/0024443 A1 Feb. 4, 2010

(51) Int. Cl.
*F25D 17/06* (2006.01)
(52) U.S. Cl. ............... 62/94; 62/238.3; 62/489
(58) Field of Classification Search ............. 62/79, 111, 62/238.3, 476, 478, 479, 485, 513, 238.1, 62/489, 94; 60/39.12, 275, 912, 649
See application file for complete search history.

(56) References Cited

U.S. PATENT DOCUMENTS

| | | |
|---|---|---|
| 3,423,078 A | 1/1969 | May |
| 3,796,045 A | 3/1974 | Foster-Pegg |
| 3,831,667 A | 8/1974 | Kilgore et al. |
| 4,223,529 A | 9/1980 | Willyoung |
| 4,353,217 A | 10/1982 | Nishioka et al. |
| 4,379,485 A | 4/1983 | Fisher, Jr. et al. |
| 4,520,634 A | 6/1985 | Oouchi et al. |
| 4,655,975 A | 4/1987 | Snoble |
| 5,555,738 A | 9/1996 | DeVault |
| 5,675,970 A | 10/1997 | Yamada et al. |
| 5,787,970 A | 8/1998 | Larinoff |
| 6,058,695 A | 5/2000 | Ranasinghe et al. |
| 6,160,318 A * | 12/2000 | Komura .................. 290/2 |
| 6,170,263 B1 | 1/2001 | Chow et al. |
| 7,178,348 B2 | 2/2007 | Stuhlmueller |
| 2003/0051496 A1 | 3/2003 | Fukushima et al. |
| 2006/0123767 A1 | 6/2006 | Briesch |
| 2007/0006565 A1 | 1/2007 | Fleischer et al. |

FOREIGN PATENT DOCUMENTS

| | | |
|---|---|---|
| JP | 2042102 A | 2/1990 |
| JP | 2004069276 A | 3/2004 |

OTHER PUBLICATIONS

EP09166170, European Search Report and Written Opinion, Nov. 2, 2010.

* cited by examiner

*Primary Examiner* — Mohammad Ali
(74) *Attorney, Agent, or Firm* — Cantor Colburn LLP

(57) ABSTRACT

A heat recovery system for a turbomachine system includes a heat removal system and a refrigeration system. The heat removal system is fluidly connected to at least one component of the turbomachine system. The heat removal system passes a cooling fluid through the at least one component to absorb heat. The refrigeration system is operatively connected to the heat removal system. The refrigeration system extracts the heat from the cooling fluid passing through the at least one component of the turbomachine system to produce a cooling effect.

5 Claims, 2 Drawing Sheets

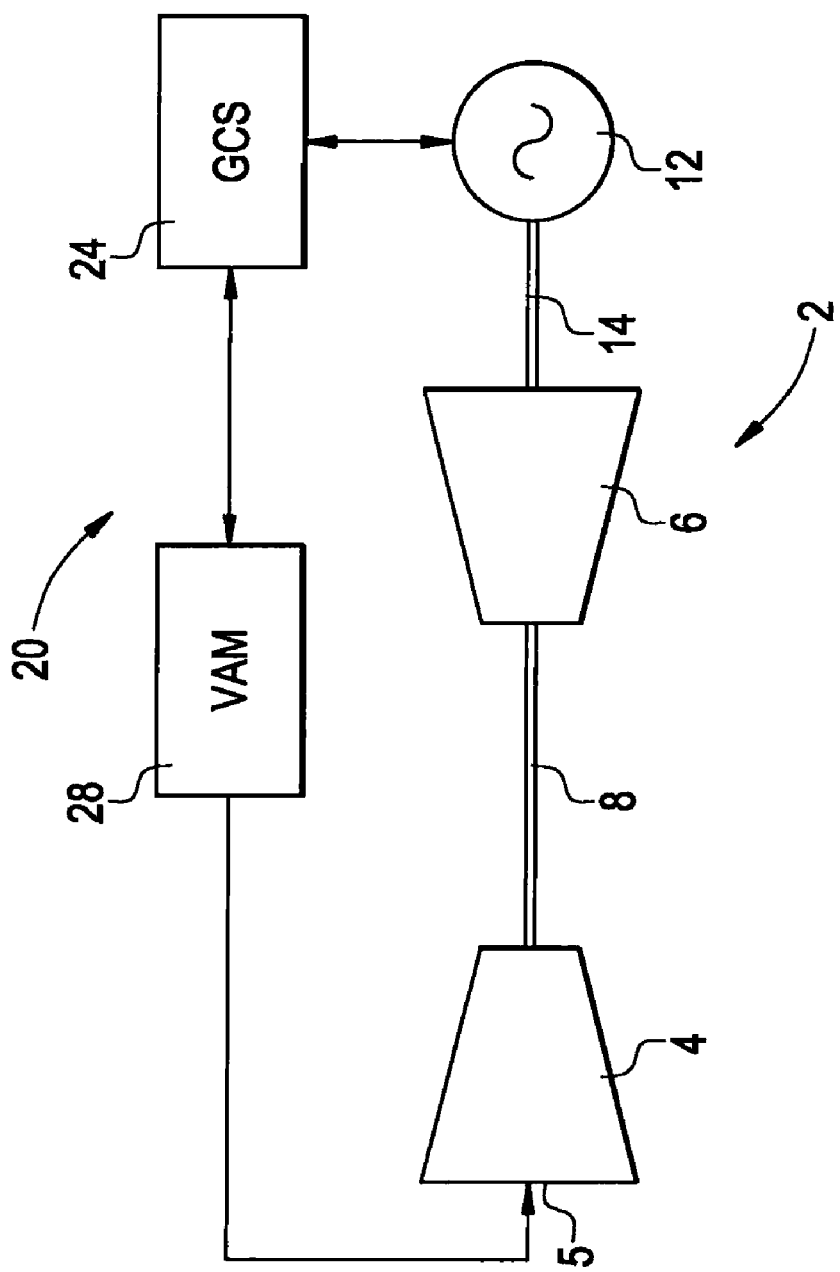

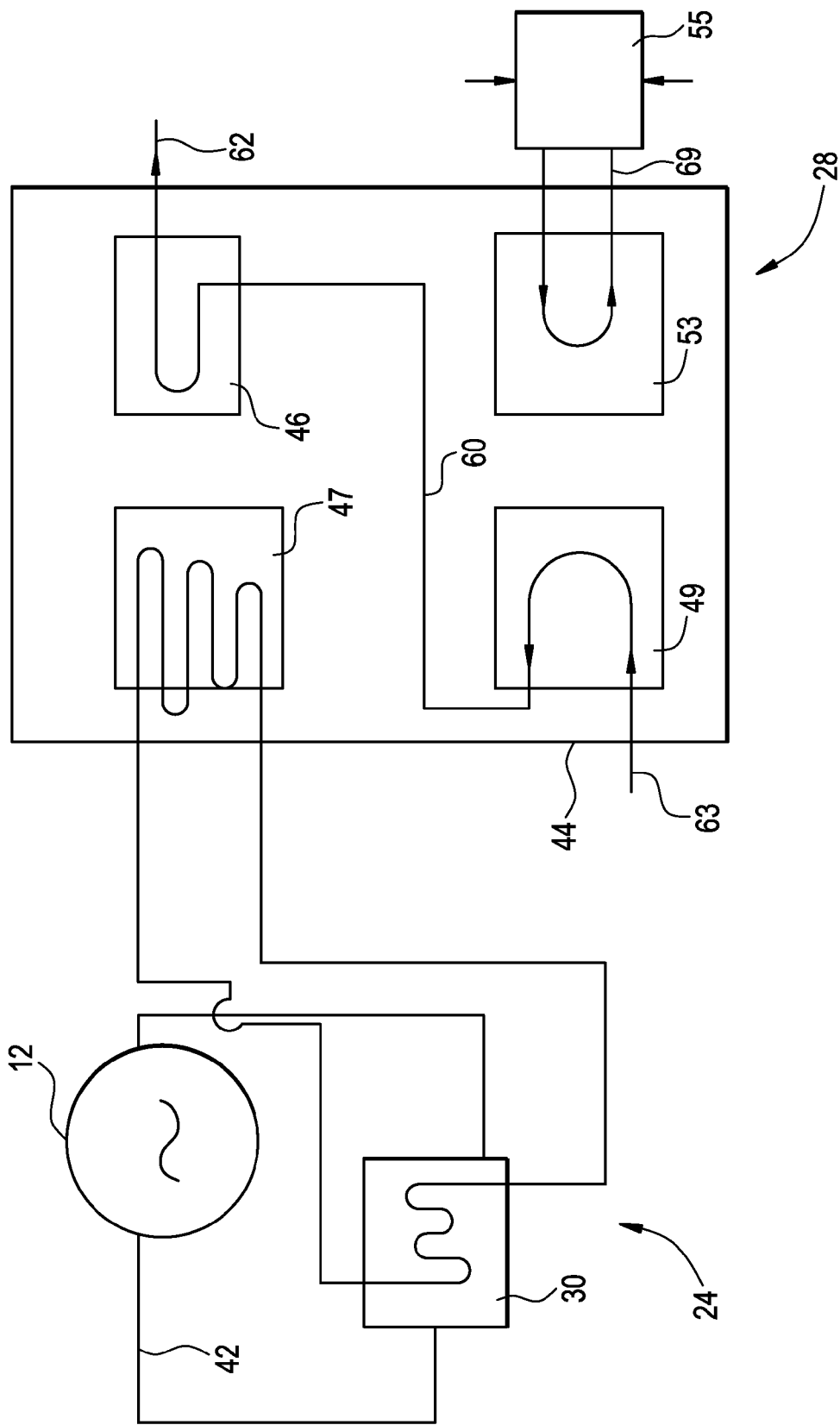

POWER PLANT HEAT RECOVERY SYSTEM HAVING HEAT REMOVAL AND REFRIGERATOR SYSTEMS

BACKGROUND OF THE INVENTION

Exemplary embodiments of the present invention relate to the art of heat recovery systems and, more particularly, to a heat recovery system for a turbomachine system.

In operation, generators, particularly those employed in connection with gas and steam turbine combined systems, produce a large amount of heat. In order to reduce the amount of heat, most generators are provided with cooling systems. In some instances, air cooling is sufficient. In other cases, particularly in larger generator systems, water is employed as a cooling medium. More specifically, water is directed through, for example stator windings, to capture and guide heat away from the generator. The water is then passed through a cooling tower to remove absorbed heat before being again passed through the generator. While effective, the heat captured from the water is lost, thus resulting in a lower overall efficiency for the power plant. Furthermore, the additional work required to pass the water though the cooling tower further contributes to power plant inefficiencies.

BRIEF DESCRIPTION OF THE INVENTION

In accordance with one exemplary embodiment of the invention, a heat recovery system includes a heat removal system and a refrigeration system. The heat removal system is fluidly connected to at least one heat producing component. The heat removal system passes a cooling fluid through the at least one heat producing component to absorb heat. The refrigeration system is operatively connected to the heat removal system. The refrigeration system extracts the heat from the cooling fluid passing through the at least one heat producing component to produce a cooling effect.

In accordance with another exemplary embodiment of the invention, a method of operating a heat recovery system includes directing a flow of fluid through at least one heat producing component. The fluid absorbs heat from the at least one heat producing component to form a heated fluid. The method further includes passing the heated fluid through a refrigeration system. The refrigeration system extracts the heat from the heated fluid to produce a cooling effect.

BRIEF DESCRIPTION OF THE DRAWINGS

FIG. 1 is a schematic illustration of a heat recovery system for a turbomachine system in accordance with exemplary embodiments of the invention; and FIG. 2 is a schematic illustration of a heat removal system portion and a refrigeration system portion of the heat recovery system of FIG. 1.

DETAILED DESCRIPTION

With initial reference to FIG. 1, a turbomachine system constructed in accordance with exemplary embodiments of the invention is indicated generally at 2. Turbomachine system 2 includes a compressor 4, having a compressor intake 5, operatively connected to a turbine 6 via a shaft 8. Turbine 6, in turn, is operatively coupled to a generator 12 via a shaft 14. In accordance with the exemplary embodiment shown, turbomachine system 2 is provided with a heat recovery system 20 having a heat removal system 24 and a refrigeration system 28. As will be discussed more fully below, heat recovery system 20 recovers heat, typically lost to ambient, from one or more components of turbomachine system 2, such as, but not limited to, generator 12. The heat is re-utilized in refrigeration system 28 to provide additional cooling for turbomachine system components, such as, but not limited to, compressor intake 5 or other working fluid streams (not shown). Of course it should be understood that the additional cooling could also be employed as climate control for other systems/structures.

As best shown in FIG. 2, heat removal system 24 is fluidly connected to generator 12. Heat removal system 24 includes a first cooling circuit 42 that directs a fluid through, for example, a stator portion (not shown) of generator 12. At this point it should be understood that the term "fluid" should be construed to include both liquids and gases. The fluid passing through generator 12 absorbs heat from the stator in order to maintain desired operating temperatures. More specifically, the fluid passing through generator 12 absorbs heat and transformed into a heated fluid. The heated fluid is utilized by refrigeration system 28 in a manner that will be discussed more fully below.

As further shown in FIG. 2, refrigeration system 28 takes the form of a vapor absorption system (VA) 44 including a condenser 46, a refrigerant generator 47, an absorber 49, and an evaporator 53. Evaporator 53 is fluidly connected to a cooling coil 55. Vapor absorption system 44 includes a second cooling circuit 60 fluidly connecting condenser 46, absorber 49 and a cooling tower (not shown). More specifically, second cooling circuit 60 contains a fluid that absorbs heat from the heated fluid formed by absorbing heat in heat removal system 24. The cooling fluid then flows through condenser 46 and through piping 62 towards the cooling tower. The fluid flowing from the cooling tower passes through additional piping 63 and back into absorber 49 before re-entering condenser 46 to take on additional heat from the heated fluid present within heat removal system 24.

At the same time, vapor absorption machine 44, by virtue of absorption cycle operation, generates a cooling fluid flow that is passed to a cooling coil 55. An airflow is passed over cooling coil 55. The airflow loses heat to the cooling fluid to form a cooling air flow. The cooling airflow is then directed to compressor intake 5 or, alternatively, to other turbomachine system components and/or associated structures. More specifically, evaporator 53 is fluidly connected to cooling coil 66 via a third cooling circuit 69. Third cooling circuit 69 contains a fluid that circulates between evaporator 53 and cooling coil 66. Air passing across cooling coil 55, passes over third cooling circuit 69 and, loses heat to the cooling fluid within third cooling circuit 69. Thus, air entering cooling coil 66 at a first temperature exits at a second, lower temperature. The cooling fluid within third cooling circuit 69 passes through evaporator 53 to exchange heat captured from the airflow passing through cooling coil 66 with refrigerant.

Based on the above, it should be apparent that the heat recovery system of the present invention utilizes heat typically lost from turbomachine system 2 to provide cooling air to other turbomachine system components. In this manner, turbomachine efficiencies are enhanced. It has been shown that, by directing air across a cooling coil connected to a refrigeration system powered by heat lost from a turbomachine system component, an approximately 13 megawatt increase in turbomachine system output is realized by turbomachine system 2. This increased output results in an efficiency gain of approximately 0.1%. Thus, heat that is normally lost is recovered and re-utilized to enhance power plant efficiency.

In general, this written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of exemplary embodiments of the present invention if they have structural elements that do not differ from the literal language of the claims, or if they include equivalent structural elements with insubstantial differences from the literal language of the claims.

The invention claimed is:

1. A heat recovery system comprising:
   a heat removal system fluidly connected to an electrical power generator, the heat removal system passing a cooling fluid through the generator to absorb heat; and
   a vapor absorption refrigeration system operatively connected to the heat removal system, the vapor absorption refrigeration system being devoid of a refrigerant compressor and being configured and disposed to extract extracting the heat from the cooling fluid passing through the generator to produce a cooling effect.

2. The heat recovery system according to claim 1, further comprising: a turbomachine system including a compressor having an intake, the vapor absorption refrigeration system being operatively coupled to the turbomachine system.

3. The heat recovery system according to claim 2, wherein the cooling effect is employed to cool an air flow passed to the intake of the compressor.

4. A method of operating a heat recovery system, the method comprising: operating an electrical power generator;
   directing a flow of fluid through the generator, the fluid absorbing heat from the generator to form a heated fluid; and
   passing the heated fluid through a vapor absorption refrigeration system devoid of a refrigerant compressor, the vapor absorption refrigeration system extracting the heat from the heated fluid to produce a cooling effect.

5. The method of claim 4, further comprising:
   cooling an airflow with the cooling effect to form a cooling airflow; and
   guiding the cooling airflow to an intake of a compressor.

* * * * *